(12) United States Patent
Kim et al.

(10) Patent No.: US 11,367,925 B2
(45) Date of Patent: Jun. 21, 2022

(54) SEPARATOR AND METHOD OF MANUFACTURING THE SAME

(71) Applicants: W-SCOPE KOREA CO., LTD., Cheongju-si (KR); W-SCOPE CHUNGJU PLANT CO., LTD., Chungju-si (KR)

(72) Inventors: Byung Hyun Kim, Yongin-si (KR); Hee Min Cho, Cheongju-si (KR); Pyung Yong Park, Cheongju-si (KR); Gi Won Yoo, Cheongju-si (KR)

(73) Assignees: W-SCOPE KOREA CO., LTD., Cheongju-si (KR); W-SCOPE CHUNGJU PLANT CO., LTD., Chungju-si (KR)

(*) Notice: Subject to any disclaimer, the term of this patent is extended or adjusted under 35 U.S.C. 154(b) by 437 days.

(21) Appl. No.: 16/358,074

(22) Filed: Mar. 19, 2019

(65) Prior Publication Data
US 2020/0067054 A1    Feb. 27, 2020

(30) Foreign Application Priority Data
Aug. 23, 2018 (KR) .......... 10-2018-0098403

(51) Int. Cl.
*H01M 50/411*     (2021.01)
*H01M 50/403*     (2021.01)
*H01M 10/0525*    (2010.01)

(52) U.S. Cl.
CPC ....... *H01M 50/411* (2021.01); *H01M 50/403* (2021.01); *H01M 10/0525* (2013.01)

(58) Field of Classification Search
CPC .......... H01M 10/052; H01M 10/0525; H01M 50/403; H01M 50/411; H01M 2/145; H01M 2/1653
See application file for complete search history.

(56) References Cited

U.S. PATENT DOCUMENTS

| 2003/0050401 A1 | 3/2003 | Jackson et al. |
| 2016/0126518 A1* | 5/2016 | Park .............. H01M 50/403 521/143 |

FOREIGN PATENT DOCUMENTS

| JP | 09-216964 A | 8/1997 |
| JP | 11-144700 A | 12/2000 |
| JP | 11-172036 A | 1/2001 |
| JP | 4583532 B2 | 11/2010 |
| JP | 2011-006585 A | 1/2011 |
| JP | 2017-203145 A | 11/2017 |
| JP | 2019-517731 A | 6/2019 |
| KR | 10-2016-0052332 A | 5/2016 |
| KR | 10-2016-0129580 A | 11/2016 |
| KR | 2016-0146134 A | 12/2016 |
| KR | 10-2018-0024101 A | 3/2018 |
| KR | 10-2018-0033487 A | 4/2018 |
| WO | 97-044837 A1 | 11/1997 |

OTHER PUBLICATIONS

Kishii et al., JP 2001176484 A, Porous Film, Jun. 29, 2001, Espacenet machine translation (Year: 2001).*

* cited by examiner

*Primary Examiner* — Adam A Arciero
(74) *Attorney, Agent, or Firm* — Novick, Kim & Lee, PLLC; Jae Youn Kim

(57) ABSTRACT

Provided is a separator that includes a matrix including a polyolefin having a weight average molecular weight ($M_w$) of 250,000 to 450,000 and a molecular weight distribution ($M_w/M_n$) of 3 to 7; and a silane-modified polyolefin cross-linked in the matrix, and a method of manufacturing the same.

19 Claims, No Drawings

SEPARATOR AND METHOD OF MANUFACTURING THE SAME

CROSS-REFERENCE TO RELATED APPLICATION

This application claims priority to and the benefit of Korean Patent Application No. 2018-98403, filed on Aug. 23, 2018, the disclosure of which is incorporated herein by reference in its entirety.

BACKGROUND

1. Field of the Invention

The present disclosure relates to a separator and a method of manufacturing the same, and more particularly, to a separator for high output and large capacity lithium ion batteries and a method of manufacturing the same.

2. Discussion of Related Art

Lithium secondary batteries are widely used as output sources for various electric products requiring miniaturization and weight reduction, such as smartphones, notebooks, and tablet PCs. As such lithium secondary batteries are applied to various fields, such as smart grids and medium and large batteries for electric vehicles, there is a need for development of a lithium secondary battery that has a large capacity, long lifespan, and high stability.

Such goals can be accomplished by using a separator with micropores, which separates a positive electrode from a negative electrode to prevent an internal short circuit and allows smooth movement of lithium ions during charging/discharging. When the separator is made using a polyolefin such as polyethylene, pores can be easily formed through thermally induced phase separation, economic efficiency is high, and required properties of a separator can be satisfied. Accordingly, research and development of a microporous separator using a polyolefin is actively underway.

However, a separator made of a polyethylene with a low melting point of about 135° C. may shrink and may be deformed at a higher temperature than the melting point due to heat generation of a battery. A short circuit, caused by such deformation, may cause thermal runaway of a battery, resulting in safety problems such as ignition. To address such a problem, a method of crosslinking a polyolefin separator to improve heat resistance has been proposed.

Japanese Unexamined Patent Application Publication Nos. 11-144700 and 11-172036 disclose a method of manufacturing a crosslinked separator using a silane-modified polyolefin to improve heat resistance. However, a separator manufactured by such a method exhibits properties such as a thickness of about 25 μm, an air permeability of about 900 sec/100 ml, and a puncture strength of about 200 gf. Such properties are much poorer than properties of commercially available separators such as a thickness of 12 μm or less, an air permeability of 150 sec/100 ml or less, and a puncture strength of 250 gf or more. Accordingly, it is impossible to commercialize a separator manufactured by the method.

Japanese Patent No. 4583532 discloses a method of mixing ultra-high-molecular-weight polyethylene with a weight average molecular weight of 500,000 or more with a silane-modified polyolefin to manufacture a separator. However, there is a disadvantage in that dispersibility of the silane-modified polyolefin in the ultra-high-molecular-weight polyethylene is poor. Accordingly, a separator manufactured by the method is non-uniform, whereby a rejection rate thereof is high. In addition, since a silane-crosslinkable polyolefin is concentrated at a portion of the separator, it is impossible to obtain a separator having uniform properties.

RELATED ART DOCUMENTS

Patent Documents (Patent Document 1) Japanese Unexamined Patent Application Publication No. 11-144700

(Patent Document 2) Japanese Unexamined Patent Application Publication No. 11-172036

(Patent Document 3) Japanese Patent No. 4583532

SUMMARY OF THE INVENTION

Therefore, the present disclosure has been made in view of the above problems, and it is one object of the present disclosure to provide a separator, in which excellent mechanical properties are uniformly realized throughout a film, and a method of manufacturing the same.

It is another object of the present disclosure to provide a separator that does not require a pore-forming agent due to elution of an alkoxyvinylsilane and thus manufacturing costs can be reduced, and a method of manufacturing the same.

In accordance with an aspect of the present disclosure, the above and other objects can be accomplished by the provision of a separator including a matrix including a polyolefin having a weight average molecular weight ($M_w$) of 250,000 to 450,000 and a molecular weight distribution ($M_w/M_n$) of 3 to 7; and a silane-modified polyolefin crosslinked in the matrix.

In an embodiment, the polyolefin may be one selected from the group consisting of polyethylene, polypropylene, ethylenevinylacetate, ethylenebutylacrylate, ethyleneethylacrylate, and a combination or copolymer of two or more thereof.

In an embodiment, the content of the silane-modified polyolefin in the separator may be 0.5 to 30% by weight.

In an embodiment, a content ratio of a polyolefin to a silane in the silane-modified polyolefin may be 100:1 to 10 parts by weight.

In an embodiment, the silane may be a vinylsilane containing an alkoxy group.

In an embodiment, the vinylsilane containing an alkoxy group may be one selected from the group consisting of trimethoxyvinylsilane, triethoxyvinylsilane, triacetoxyvinylsilane, and a combination of two or more thereof.

In an embodiment, the separator may satisfy one or more of the following conditions (i) to (ix):
(i) an air permeability of 50 to 300 sec/100 ml;
(ii) a puncture strength of 15 to 65 gf/μm;
(iii) a machine direction (MD) tensile strength of 500 to 3,000 $kgf/cm^2$;
(iv) a transverse direction (TD) tensile strength of 500 to 2,500 $kgf/cm^2$;
(v) a machine direction (MD) tensile elongation of 40% or more;
(vi) a transverse direction (TD) tensile elongation of 40% or more;
(vii) a machine direction (MD) heat shrinkage at 120° C. of 20% or less;
(viii) a transverse direction (TD) heat shrinkage at 120° C. of 20% or less; and
(ix) a meltdown temperature of 170 to 250° C.

In accordance with another aspect of the present disclosure, there is provided a method of manufacturing a separator, the method including feeding a composition comprising a polyolefin having a weight average molecular weight ($M_w$) of 250,000 to 450,000 and a molecular weight distribution ($M_w/M_n$) of 3 to 7, a silane-modified polyolefin and a pore-forming agent into an extruder and casting and orienting the same in a sheet shape; extracting the pore-forming agent from the oriented sheet to prepare a porous film; and crosslinking the silane-modified polyolefin included in the porous film.

In an embodiment, the polyolefin may be one selected from the group consisting of polyethylene, polypropylene, ethylenevinylacetate, ethylenebutylacrylate, ethyleneethylacrylate, and a combination or copolymer of two or more thereof.

In an embodiment, the composition may include 20 to 40% by weight of the polyolefin, 0.5 to 30% by weight of the silane-modified polyolefin, and 40 to 75% by weight of the pore-forming agent.

In an embodiment, the silane may be a vinylsilane containing an alkoxy group.

In an embodiment, the vinylsilane containing an alkoxy group may be one selected from the group consisting of trimethoxyvinylsilane, triethoxyvinylsilane, triacetoxyvinylsilane, and a combination of two or more thereof.

In an embodiment, the pore-forming agent may be one selected from the group consisting of paraffin oil, paraffin wax, mineral oil, solid paraffin, soybean oil, rape oil, palm oil, coconut oil, di-2-ethylhexylphthalate, dibutylphthalate, diisononylphthalate, diisodecylphthalate, bis(2-propylheptyl)phthalate, naphthene oil, and a combination of two or more thereof.

In an embodiment, the composition may further include a crosslinking catalyst.

In an embodiment, the crosslinking catalyst may be previously mixed with the pore-forming agent, and then may be fed through a side injector of the extruder.

In an embodiment, the content of the crosslinking catalyst in the composition may be 0.01 to 5% by weight.

In an embodiment, in the crosslinking, the porous film may be fed into a crosslinking bath containing a solution with a boiling point of 100° C. or more and may be continuously passed therethrough.

In an embodiment, the solution may include one selected from the group consisting of water, ethylene glycol, diethylene glycol, propylene glycol, and a combination of two or more thereof.

In an embodiment, the crosslinking may be performed at 120° C. or more.

In an embodiment, the solution further may further include a crosslinking catalyst.

In an embodiment, the content of the crosslinking catalyst in the solution may be 0.01 to 10% by weight.

DETAILED DESCRIPTION OF EXEMPLARY EMBODIMENTS

Hereinafter, the present disclosure will be described in detail. The present disclosure may, however, be embodied in many different forms and should not be construed as limited to the embodiments set forth herein.

In the specification, when it is described that a certain part is "connected" to another part, it should be understood that the certain part may be directly connected to another part or indirectly connected to another part via another member in the middle. In addition, when a certain part "includes" a certain component, this indicates that the part may further include another component instead of excluding the other component unless there is a specifically contradictory statement.

Separator

An aspect of the present disclosure provides a separator including: a matrix including a polyolefin with a weight average molecular weight ($M_w$) of 250,000 to 450,000 and a molecular weight distribution ($M_w/M_n$) of 3 to 7; and a silane-modified polyolefin crosslinked in the matrix.

Since the silane-modified polyolefin included in the separator is crosslinked in the matrix and thus firmly supports and fixes the matrix, the mechanical properties of the separator can be improved. The term "matrix," used in the present specification, indicates a component constituting a continuous phase in a separator including two or more ingredients. That is, a polyolefin with a weight average molecular weight ($M_w$) of 250,000 to 450,000 and a molecular weight distribution ($M_w/M_n$) of 3 to 7 may be present in a continuous phase in the separator, and a silane-modified polyolefin crosslinked in the separator may be present in a discontinuous phase.

In a conventional process of manufacturing a separator including a polyolefin and a silane-based compound, a base sheet, from which a pore-forming agent has not been extracted, is coated with a silane-based compound, followed by performing grafting. In addition, a method of manufacturing a base sheet after previously mixing a polyolefin with a silane-based compound, and then grafting the same to manufacture a crosslinked separator has been attempted. However, this method can satisfy the properties of a commercially available separator, but may cause an increase in manufacturing costs because the silane-based compound is grafted with other compositions other than a polyolefin and the compositions should be discarded in every process.

In an embodiment of the present disclosure, the crosslinking of the silane-modified polyolefin is performed after a series of processes including extrusion, orienting, extraction, and the like. Accordingly, it is required to uniformly adjust the distribution of the silane-modified polyolefin in a porous film such that a crosslinked silane-modified polyolefin is uniformly distributed in the separator. When a crosslinking reaction of the silane-modified polyolefin is concentrated at a portion of the separator, required mechanical properties may not be realized. In particular, since mechanical property differences among regions of the separator are great, the reliability and reproducibility of a product may be significantly decreased.

In accordance with an embodiment of the present disclosure, the silane-modified polyolefin may be uniformly dispersed in the polyolefin in a process of kneading the polyolefin and the silane-modified polyolefin in an extruder by controlling the molecular weight and molecular weight distribution of the polyolefin, which constitutes the matrix, to be in predetermined ranges.

The weight average molecular weight ($M_w$) of the polyolefin may be 250,000 to 450,000. When the weight average molecular weight of the polyolefin is less than 250,000, melt viscosity may be excessively lowered, whereby the dispersibility of the silane-modified polyolefin may be greatly decreased. In addition, phase separation or layer separation between the polyolefin and the silane-modified polyolefin may occur in some cases. When the weight average molecular weight of the polyolefin is greater than 450,000, melt viscosity increases. Accordingly, processability is decreased, which may cause non-uniform kneading during melt kneading.

The polyolefin may have a molecular weight distribution ($M_w/M_n$) of 3 to 7. When the molecular weight distribution of the polyolefin is less than 3, dispersibility of a silane-modified polyolefin and a pore-forming agent is decreased, whereby the uniformity of a manufactured separator may be decreased. When the molecular weight distribution of the polyolefin is greater than 7, the mechanical strength of a final separator may be decreased.

The polyolefin may be one selected from the group consisting of polyethylene, polypropylene, ethylenevinylacetate, ethylenebutylacrylate, ethyleneethylacrylate, and a combination or copolymer of two or more thereof, preferably polyethylene, but the present disclosure is not limited thereto.

The content of the silane-modified polyolefin in the separator may be 0.5 to 30% by weight. When the content of the silane-modified polyolefin in the separator is less than 0.5% by weight, a silane crosslinking reaction may be inhibited and thus it may be difficult to realize a required level of the mechanical properties. When the content of the silane-modified polyolefin is greater than 30% by weight, it may be difficult to realize properties required in a commercially available separator.

The silane-modified polyolefin may be a substance formed by grafting a silane to a polyolefin. A content ratio of the polyolefin to the silane in the silane-modified polyolefin may be 100:1 to 10 parts by weight. When the content of the silane is less than 1 part by weight, a silane crosslinking reaction may be inhibited. When the content of the silane is greater than 10 parts by weight, the mechanical properties of a separator satisfy only a required level, which is disadvantageous in terms of economic feasibility and productivity.

The silane may be a vinylsilane containing an alkoxy group. For example, the vinylsilane containing an alkoxy group may be one selected from the group consisting of trimethoxyvinylsilane, triethoxyvinylsilane, triacetoxyvinylsilane, and a combination of two or more thereof, preferably trimethoxyvinylsilane, but the present disclosure is not limited thereto.

The separator having a structure wherein a predetermined amount of the silane-modified polyolefin is crosslinked in the polyolefin-based matrix adjusted to have a molecular weight within a predetermined range as described above may satisfy one or more of the following conditions (i) to (ix): (i) air permeability: 50 to 300 sec/100 ml, preferably, 125 to 300 sec/100 ml; (ii) puncture strength: 15 to 65 gf/μm, preferably, 21.5 to 65 gf/μm; (iii) machine direction (MD) tensile strength: 500 to 3,000 kgf/cm$^2$, preferably, 700 to 2,000 kgf/cm$^2$; (iv) transverse direction (TD) tensile strength: 500 to 2,500 kgf/cm$^2$, preferably, 700 to 2,000 kgf/cm$^2$; (v) machine direction (MD) tensile elongation: 40% or more, preferably, 40 to 80%; (vi) transverse direction (TD) tensile elongation: 40% or more, preferably, 40 to 55%; (vii) machine direction (MD) heat shrinkage at 120° C.: 20% or less, preferably, 10% or less; (viii) transverse direction (TD) heat shrinkage at 120° C.: 20% or less, preferably, 15% or less; and (ix) meltdown temperature: 170 to 250° C., preferably, 200 to 250° C., more preferably, 225 to 250 C. A separator satisfying these conditions may be used as a separator for lithium ion batteries, particularly a separator for a high output and large capacity lithium ion battery of an electric vehicle (EV).

Separator Manufacturing Method

Another aspect of the present disclosure provides a method of manufacturing a separator including (a) a step of feeding a composition comprising a polyolefin having a weight average molecular weight ($M_w$) of 250,000 to 450,000 and a molecular weight distribution ($M_w/M_n$) of 3 to 7, a silane-modified polyolefin and a pore-forming agent into an extruder and casting and orienting the same in a sheet shape; (b) a step of extracting the pore-forming agent from the oriented sheet to prepare a porous film; and (c) a step of crosslinking the silane-modified polyolefin included in the porous film.

In step (a), the polyolefin having a weight average molecular weight ($M_w$) of 250,000 to 450,000 and a molecular weight distribution ($M_w/M_n$) of 3 to 7 and the composition including a silane-modified polyolefin and a pore-forming agent are extruded and discharged through a T-die, followed by being oriented, thereby manufacturing a base sheet.

The polyolefin may be one selected from the group consisting of polyethylene, polypropylene, ethylenevinylacetate, ethylenebutylacrylate, ethyleneethylacrylate, and a combination or copolymer of two or more thereof, preferably, polyethylene, but the present disclosure is not limited thereto.

The composition may include 20 to 40% by weight of the polyolefin, 0.5 to 30% by weight of the silane-modified polyolefin, and 40 to 75% by weight of the pore-forming agent. When the content of the silane-modified polyolefin in the composition is less than 0.5% by weight, a silane crosslinking reaction is inhibited, whereby it may be difficult to realize required mechanical properties. When the content of the silane-modified polyolefin is greater than 30% by weight, it may be difficult to realize properties required in a commercially available separator.

The silane may be a vinylsilane containing an alkoxy group. For example, the vinylsilane containing an alkoxy group may be one selected from the group consisting of trimethoxyvinylsilane, triethoxyvinylsilane, triacetoxyvinylsilane, and a combination of two or more thereof, preferably, trimethoxyvinylsilane, but the present disclosure is not limited thereto.

The pore-forming agent may be one selected from the group consisting of paraffin oil, paraffin wax, mineral oil, solid paraffin, soybean oil, rape oil, palm oil, coconut oil, di-2-ethylhexylphthalate, dibutylphthalate, diisononylphthalate, diisodecylphthalate, bis(2-propylheptyl)phthalate, naphthene oil, and a combination of two or more thereof, preferably paraffin oil, more preferably paraffin oil having a kinematic viscosity of 50 to 100 cSt at 40° C., but the present disclosure is not limited thereto.

The composition may further include a crosslinking catalyst. When the composition further includes the crosslinking catalyst, the crosslinking in step (c) may be promoted. As the crosslinking catalyst, carboxylates of metals such as tin, zinc, iron, lead, and cobalt, organic bases, inorganic acids, and organic acids may be generally used. For example, the crosslinking catalyst may be an inorganic acid such as dibutyltin dilaurate, dibutyltin diacetate, stannous acetate, stannous caprylate, zinc naphthenate, zinc caprylate, cobalt naphthenate, ethylamine, dibutylamine, hexylamine, pyridine, sulfuric acid, or hydrochloric acid, or an organic acid such as toluenesulfonic acid, acetic acid, stearic acid, or maleic acid, preferably dibutyltin dilaurate, but the present disclosure is not limited thereto.

Conventionally, the crosslinking catalyst has been added to prepare a silane-modified polyolefin, or a method of coating a porous film with a solution or dispersion including the crosslinking catalyst has been used. However, such conventional methods have difficulties in uniformly dispersing the crosslinking catalyst along with the silane-modified polyolefin. As described above, the silane-modified polyolefin included in the porous film should be uniformly dispersed before crosslinking. Here, the crosslinking catalyst involved in crosslinking reaction of the silane-modified polyolefin should also be uniformly dispersed.

With regard to this, the efficiency of the crosslinking reaction may be further increased by uniformly dispersing the crosslinking catalyst along with the silane-modified polyolefin after previously mixing the crosslinking catalyst with the pore-forming agent and feeding this mixture through a side injector of the extruder.

The content of the crosslinking catalyst in the composition may be 0.01 to 5% by weight. When the content of the crosslinking catalyst is less than 0.01% by weight, it may be difficult to promote a crosslinking reaction to a required level. When the content of the crosslinking catalyst is greater than 5% by weight, a reaction rate converges to a required level, which may be disadvantageous in terms of economic feasibility and productivity. The orientation of step (a) may be performed by a known method such as uniaxial orientation or biaxial orientation (sequential or simultaneous biaxial orientation). In the sequential biaxial orientation, a stretching ratio may be 4 to 20 times in each of machine direction (MD) and transverse direction (TD) and the consequent surface magnification may be 16 to 400 times.

In step (c), the silane-modified polyolefin included in the porous film may be crosslinked. To perform this crosslinking, the porous film may be placed in a constant temperature and humidity chamber, the temperature and humidity of which are adjusted into predetermined ranges. Here, since step (c) is performed in a moisture environment, in which it is difficult to elevate the temperature to a certain temperature or more, whether it is performed discontinuously or continuously with steps (a) and (b), an excessive time may be required for the crosslinking reaction. To address this problem, in step (c), the porous film may be passed through a water bath at about 90° C. Alternatively, the porous film may be fed into a crosslinking bath containing a solution having a boiling point of 100° C. or more, preferably 120° C. or more, more preferably 150° C. or more and may be continuously passed therethrough, thereby significantly shortening the time taken for a crosslinking reaction and thus improving productivity.

In particular, since the solution includes an ingredient having a boiling point of 100° C. or more, the temperature may be adjusted to 100° C. or more, preferably 120° C. or more, more preferably 120 to 130° C., during the crosslinking reaction to promote the crosslinking reaction. As the ingredient, one selected from the group consisting of ethylene glycol, diethylene glycol, propylene glycol, and a combination of two or more thereof may be used. Since these ingredients are hygroscopic, moisture contained in the ingredients may cause a crosslinking reaction. However, as needed, the ingredients may be additionally mixed with a certain amount of water.

In addition, the solution may further include a crosslinking catalyst. In this case, the crosslinking reaction may be sufficiently promoted without mixing with a predetermined amount of water. The content of the crosslinking catalyst in the solution may be 0.01 to 10% by weight, preferably 0.1 to 5% by weight. When the content of the crosslinking catalyst is less than 0.01% by weight, it may be difficult to promote the crosslinking reaction to a required level. When the content of the crosslinking catalyst is greater than 10% by weight, a reaction rate converges to a required level, which may be disadvantageous in terms of economic feasibility and productivity.

The crosslinking catalyst included in the solution in the crosslinking bath has an action effect substantially similar to that included in the composition. However, the crosslinking catalyst included in the composition, i.e., the crosslinking catalyst fed through a side injector of an extruder in step (a), may effectively crosslink the silane-modified polyolefin distributed in a central portion (central layer) of the porous film of step (c), but has difficulties in actively participating in the crosslinking reaction of the silane-modified polyolefin distributed at a surface portion (skin layer). The crosslinking catalyst included in the solution in the crosslinking bath may contact a surface portion (skin layer) of the porous film when the porous film passes through the crosslinking bath. Accordingly, the crosslinking reaction of the silane-modified polyolefin distributed on the surface portion (skin layer) of the porous film may be further promoted. The type and action effect of the crosslinking catalyst have been described above.

Hereinafter, examples of the present disclosure will be described in detail. In the examples, SH-100X, manufactured by TSC, and XHE740N, manufactured by MCPP, were used alone or in a combination as silane-modified polyethylene. In the comparative examples, Linkron HF-700N, manufactured by Mitsubishi Chemical Corporation, was used as silane-modified polyethylene.

Example 1

25 parts by weight of high-density polyethylene (HDPE) having a weight average molecular weight ($M_w$) of 350,000 and a molecular weight distribution ($M_w/M_n$) of 5, 0.5 part by weight of silane-modified polyethylene, and 70 parts by weight of paraffin oil having a kinematic viscosity of 70 cSt at 40° C. were mixed, and then fed into a twin-screw extruder (inner diameter: 58 mm, L/D=56). The mixture was discharged to a T-die with a width of 300 mm from the twin-screw extruder at 200° C. and a screw rotation speed of 40 rpm. Subsequently, a base sheet with a thickness of 800 μm was manufactured by being allowed to pass through a 40° C. casting roll. The base sheet was elongated six times in a machine direction (MD) in a 110° C. roll orienter and elongated seven times in a transverse direction (TD) in a 125° C. tenter orienter, thereby manufacturing an oriented film. The oriented film was immersed in a 25° C. dichloromethane leaching bath to extract and remove paraffin oil therefrom for one minute, thereby manufacturing a porous film. The porous film was dried at 50° C. Subsequently, the porous film was heated to 125° C. in a tenter orienter, and then released after being elongated 1.45 times in a transverse direction (TD), followed by thermally fixing to 1.25 times the size before the elongation. The porous film was crosslinked for 72 hours in a constant temperature and humidity chamber under conditions of 85° C. and a humidity of 85%, thereby manufacturing a separator.

Example 2

29.5 parts by weight of high-density polyethylene (HDPE) having a weight average molecular weight ($M_w$) of 350,000 and a molecular weight distribution ($M_w/M_n$) of 5, 0.5 part by weight of high-density silane-modified polyethylene, and 70 parts by weight of paraffin oil having a kinematic viscosity of 70 cSt at 40° C. were mixed, and then fed into a twin-screw extruder (inner diameter: 58 mm, L/D=56). Dibutyltin dilaurate, as a crosslinking catalyst, was previously dispersed in a portion of the paraffin oil, and the resultant dispersion was added in an amount of 0.5% by weight, based on a total weight of a mixture passing through the twin-screw extruder, through a side injector of the twin-screw extruder. The mixture was discharged to a T-die with a width of 300 mm from the twin-screw extruder at 200° C. and a screw rotation speed of 40 rpm. Subsequently, a base sheet with a thickness of 800 μm was manufactured by being allowed to pass through a 40° C. casting roll. The base sheet was elongated six times in a machine direction (MD) in a 110° C. roll orienter and elongated seven times in a transverse direction (TD) in a 125° C. tenter orienter, thereby manufacturing an oriented film. The oriented film was immersed in a 25° C. dichloromethane leaching bath to extract and remove paraffin oil therefrom for one minute, thereby manufacturing a porous film. The porous film was dried at 50° C. for 5 minutes. Subsequently, the porous film was heated to 125° C. in a tenter orienter, and then released 1.25 times after being elongated 1.45 times in a transverse direction (TD). The porous film was crosslinked for 72 hours in a constant temperature and humidity chamber under conditions of 85° C. and a humidity of 85%, thereby manufacturing a separator.

Example 3

A separator was manufactured in the same manner as in Example 1, except that high-density polyethylene having a weight average molecular weight ($M_w$) of 250,000 and a molecular weight distribution ($M_w/M_n$) of 6 was used instead of high-density polyethylene having a weight average molecular weight ($M_w$) of 350,000 and a molecular weight distribution ($M_w/M_n$) of 5.

Example 4

A separator was manufactured in the same manner as in Example 2, except that high-density polyethylene having a weight average molecular weight ($M_w$) of 250,000 and a molecular weight distribution ($M_w/M_n$) of 6 was used instead of high-density polyethylene having a weight average molecular weight ($M_w$) of 350,000 and a molecular weight distribution ($M_w/M_n$) of 5.

Example 5

A separator was manufactured in the same manner as in Example 1, except that the porous film was crosslinked by being fed into a crosslinking bath and being continuously passed therethrough for 30 minutes, instead of crosslinking the porous film in a constant temperature and humidity chamber. Propylene glycol was fed into the crosslinking bath, and then the temperature was elevated to 120° C.

Example 6

A separator was manufactured in the same manner as in Example 1, except that the porous film was crosslinked by being fed into a crosslinking bath and being continuously passed therethrough for 10 minutes, instead of crosslinking the porous film in a constant temperature and humidity chamber. A solution prepared by mixing propylene glycol and dibutyltin dilaurate in a weight ratio of 95:5 was fed into the crosslinking bath, and then the temperature was elevated to 120° C.

Example 7

A separator was manufactured in the same manner as in Example 1, except that the porous film was crosslinked by being fed into a crosslinking bath and being continuously passed therethrough for 60 minutes, instead of crosslinking the porous film in a constant temperature and humidity chamber. Ethylene glycol was fed into the crosslinking bath, and then the temperature was elevated to 120° C.

Example 8

A separator was manufactured in the same manner as in Example 1, except that the porous film was crosslinked by being fed into a crosslinking bath and being continuously passed therethrough for 15 minutes, instead of crosslinking the porous film in a constant temperature and humidity chamber. A solution prepared by mixing ethylene glycol and dibutyltin dilaurate in a weight ratio of 90:10 was fed into the crosslinking bath, and then the temperature was elevated to 120° C.

Example 9

35 parts by weight of high-density polyethylene (HDPE) having a weight average molecular weight ($M_w$) of 350,000 and a molecular weight distribution ($M_w/M_n$) of 5, 15 part by weight of silane-modified polyethylene, and 50 parts by weight of paraffin oil having a kinematic viscosity of 70 cSt at 40° C. were mixed, and then fed into a twin-screw extruder (inner diameter: 58 mm, L/D=56). The mixture was discharged to a T-die with a width of 300 mm from the twin-screw extruder at 210° C. and a screw rotation speed of 45 rpm. Subsequently, a base sheet with a thickness of 800 μm was manufactured by being allowed to pass through a 40° C. casting roll. The base sheet was elongated six times in a machine direction (MD) in a 110° C. roll orienter and elongated seven times in a transverse direction (TD) in a 125° C. tenter orienter, thereby manufacturing an oriented film. The oriented film was immersed in a 25° C. dichloromethane leaching bath to extract and remove paraffin oil therefrom for one minute, thereby manufacturing a porous film. The porous film was dried at 50° C. Subsequently, the porous film was heated to 125° C. in a tenter orienter, and then released after being elongated 1.45 times in a transverse direction (TD), followed by thermally fixing to 1.25 times the size before the elongation. The porous film was crosslinked for 72 hours in a constant temperature and humidity chamber under conditions of 85° C. and a humidity of 85%, thereby manufacturing a separator.

Comparative Example 1

45 parts by weight of silane-modified polyethylene having a melt index of 0.8 g/10 min and a density of 0.958 g/cm$^3$ and 55 parts by weight of paraffin oil having a kinematic viscosity of 70 cSt at 40° C. were mixed and then fed into a twin-screw extruder (inner diameter 58 mm, L/D=56). The mixture was discharged to a T-die with a width of 300 mm from the twin-screw extruder at 160° C. and a screw rotation speed of 40 rpm. Subsequently, a base sheet with a thickness of 60 μm was manufactured by being allowed to pass through a 40° C. casting roll. The base sheet was elongated 3.5 times in a machine direction (MD) in a 110° C. orienter and elongated 1.4 times in a transverse direction (TD) in an 80° C. orienter. Both surfaces of the base sheet were coated with an aqueous dibutyltin dilaurate dispersion having a concentration of 30% by weight, and then a silane crosslinking reaction was performed for 1 hour in 85° C. hot water, thereby manufacturing a crosslinked film. The crosslinked film was immersed in a 25° C. dichloromethane leaching bath to extract and remove paraffin oil therefrom for 30 minutes. The crosslinked film was dried in an 80° C. oven for 30 minutes, thereby manufacturing a crosslinked separator.

Comparative Example 2

29 parts by weight of high-density polyethylene having a melt temperature of 135° C. and a weight average molecular weight of 300,000, 65 parts by weight of paraffin oil having a kinematic viscosity of 40 cSt at 40° C., 2 parts by weight of trimethoxyvinylsilane, 2 parts by weight of dibutyltin dilaurate, and 2 parts by weight of 2,5-dimethyl-2,5-di(tert-butylperoxy)hexane were mixed, and then fed into a twin-screw extruder (inner diameter: 58 mm, L/D=56). The mixture was reacted and extruded in the twin-screw extruder at 200° C. and a screw rotation speed of 30 rpm, thereby preparing a silane-modified polyolefin composition. The prepared silane-modified polyolefin composition was discharged to a T-die with a width of 300 mm, and then was passed through a 40° C. casting roll, thereby manufacturing a base sheet with a thickness of 800 μm. The base sheet was elongated 5.5 times in a machine direction (MD) in a 108° C. roll orienter and elongated 5.5 times in a transverse direction (TD) in a 123° C. tenter orienter, thereby manufacturing an oriented film. The oriented film was immersed in a 25° C. dichloromethane leaching bath, and paraffin oil was extracted and removed therefrom for 10 minutes, thereby manufacturing a porous film. The porous film was thermally fixed at 127° C., thereby manufacturing a porous separator. The separator was crosslinked in a constant temperature and humidity chamber for 24 hours under conditions such as 80° C. and a humidity of 90%, thereby manufacturing a crosslinked separator.

Comparative Example 3

5 parts by weight of high-density polyethylene having a weight average molecular weight of 500,000, 10 parts by weight of silane-modified polyethylene having a melt index of 0.5 g/10 min and a density of 0.942 g/ml, and 85 parts by weight of paraffin oil having a kinematic viscosity of 60 cSt at 40° C. were mixed, and then fed into a twin-screw extruder (inner diameter: 58 mm, L/D=56). The mixture was discharged to a T-die with a width of 300 mm from the twin-screw extruder at 160° C. and a screw rotation speed of 40 rpm, and then was passed through a 40° C. casting roll and rolled at 115° C., thereby manufacturing a base sheet having a thickness of 500 μm. In the base sheet manufacturing process, base sheets with some defects were discarded, and base sheets having a normal appearance were selected and used.

The base sheet was elongated 3.5 times in a machine direction (MD) in a 115° C. roll orienter and elongated 3.5 times in a transverse direction (TD) in a 115° C. tenter orienter, thereby manufacturing an oriented film. The oriented film was immersed in a 25° C. dichloromethane leaching bath to extract and remove paraffin oil therefrom for one minute, thereby manufacturing a porous film. The porous film was dried at 50° C. for 5 minutes and crosslinked for 24 hours in a constant temperature and humidity chamber under conditions such as 90° C. and a humidity of 95%. Subsequently, the porous film was thermally treated at 110° C. for 30 minutes, thereby manufacturing a crosslinked separator.

Comparative Example 4

A separator was manufactured in the same manner as in Example 1, except that the porous film was crosslinked by feeding into a crosslinking bath containing boiling water and continuously passing therethrough instead of crosslinking the porous film in a constant temperature and humidity chamber.

Comparative Example 5

A separator was manufactured in the same manner as in Example 1, except that the porous film was crosslinked by feeding into a crosslinking bath containing 80° C. water and continuously passing therethrough instead of crosslinking the porous film in a constant temperature and humidity chamber.

Experimental Example 1

The properties of the present disclosure were measured according to the following test methods. The temperature was room temperature (25° C.) unless specified otherwise.

Weight average molecular weight (g/mol): Measured using a polystyrene standard sample according to a method described in Macromolecules, Vol. 34, No. 19, pp. 6,812 to 6,820 (2001) using gel permeation chromatography (GPC).

Melt index (g/10 min): A cylindrical orifice of a melt index measuring instrument set to 190° C. was filled with a sample, followed by putting a piston in the cylindrical orifice and then placing a 2.16 kg weight on the piston to add a load thereto. The amount of a sample which had passed through the cylinder for 10 minutes was measured to measure a melt index.

Density (g/ml): Measured according to ASTM D1238.

Thickness (μm): The thickness of a separator specimen was measured using a micro thickness meter.

Porosity (%): The porosity of a separator specimen with a radius of 25 mm was measured using a capillary porometer, manufactured by PMI, according to ASTM F316-03.

Air permeability (Gurley, sec/100 ml): The time taken for 100 ml of air to pass through a separator specimen with a diameter of 29.8 mm under a measurement pressure of 0.025 MPa was measured using a Gurley densometer, EGO2-5 model, manufactured by ASAHI SEIKO.

Crosslinking degree (gel fraction, %): A separator specimen was immersed in 100 mg ($W_0$) of 1,2,4-trichlorobenzene, and then heat-treated at 130° C. for 2 hours. The specimen was separated and then dried at 50° C. for 24 hours. The weight (W) of the dried specimen was measured and a crosslinking degree was measured according to the following equation:

$$\text{Crosslinking degree } (\%) = -\text{Tensile strength}\left(\text{kg}f/\text{cm}^2 \frac{W}{W_c} \times 100\right) (\%)$$

applied to a 20×200 mm separator specimen using a tensile strength meter. Stress applied until the specimen was broken was measured.

Tensile elongation (%): Stress was applied to a 20×200 mm separator specimen using a tensile strength meter. A maximum length stretched until the specimen was broken was measured, and tensile elongation was calculated according to the following equation:

$$\text{Tensile elongation } (\%) = \frac{l_1 - l_2}{l_1} \times 100$$

wherein $l_1$ denotes a transverse or longitudinal length of a specimen before stretching, and $l_2$ denotes a transverse or longitudinal length of the specimen immediately before fracture.

Puncture strength (gf): A force of 0.05 cm/sec was applied to a 100×50 mm separator specimen with a stick having a diameter of 0.5 mm using a puncture strength meter, the KES-G5 model, manufactured by KATO TECH. A force applied when the specimen was punctured was measured.

Meltdown temperature (° C.): A force of 0.01 N was applied to a separator specimen using a thermomechanical analyzer (TMA), and then the temperature was elevated at a rate of 5° C./min to measure a deformation degree of the specimen. A temperature at which the specimen was broken was set as a meltdown temperature.

Heat shrinkage (%): After a 200×200 mm separator specimen was placed between A4 paper sheets in a 120° C. oven and was allowed to stand therebetween for one hour, the separator specimen was cooled at room temperature to measure shrunken lengths, in transverse and longitudinal directions, of the specimen. Heat shrinkage was calculated according to the following equation:

$$\text{Heat shrinkage (\%)} = \frac{l_3 - l_4}{l_3} \times 100$$

wherein $l_3$ denotes a transverse or longitudinal length of a specimen before shrinkage, and $l_4$ denotes a transverse or longitudinal length of the specimen after shrinkage.

The properties of the separators manufactured according to the examples and the comparative examples were measured, and results thereof are summarized in Tables 1 and 2.

TABLE 1

| Classification | Example 2 (before crosslinking) | Example 2 (after crosslinking) |
| --- | --- | --- |
| Thickness (μm) | 9 | 9.6 |
| Porosity (%) | 50 | 52 |
| Air permeability (sec/100 ml) | 124 | 129 |
| MD tensile strength (kgf/cm²) | 1,400 | 1,590 |
| MD tensile elongation (%) | 85 | 60 |
| TD tensile strength (kgf/cm²) | 955 | 1,090 |
| TD tensile elongation (%) | 60 | 55 |
| MD heat shrinkage (%) | 11 | 5 |
| TD heat shrinkage (%) | 17 | 10 |
| Puncture strength (gf) | 190 | 230 |
| Meltdown temperature (° C.) | 150 | 210 |

TABLE 2

| Classification | Example 1 | Example 2 | Example 9 | Comparative Example 1 | Comparative Example 2 | Comparative Example 3 |
| --- | --- | --- | --- | --- | --- | --- |
| Thickness (μm) | 9.4 | 9.6 | 9.4 | 25 | 14.3 | 26 |
| Porosity (%) | 50 | 52 | 46 | 43 | 33 | 42 |
| MD tensile strength (kgf/cm2) | 1,520 | 1,590 | 1,740 | 779 | 1,350 | 2,137 |
| MD tensile elongation (%) | 67 | 60 | 58 | 173 | 210 | 47 |
| TD tensile strength (kgf/cm2) | 1,020 | 1,090 | 1,350 | 543 | 1280 | 1,793 |
| TD tensile elongation (%) | 52 | 55 | 48 | 159 | 183 | 33 |
| MD heat shrinkage (%) | 7 | 5 | 3 | 12 | 11 | 17 |
| TD heat shrinkage (%) | 11 | 10 | 7 | 14 | 13 | 19 |
| Puncture strength (gf) | 210 | 230 | 360 | 150 | 480 | 350 |
| Meltdown temperature (° C.) | 205 | 210 | 225 | 177 | 190 | 185 |

Experimental Example 2

Paraffin oil recovered after being extracted from the dichloromethane leaching bath of each of the examples and Comparative Examples 1 and 2 was subjected to inductively coupled plasma atomic emission spectrometry (ICP). Results are summarized in Table 3 below.

TABLE 3

| Classification | Si content (mg/kg) | Sn content (mg/kg) | Notes |
| --- | --- | --- | --- |
| Example 2 | 5 | 3 | Within measurement error |
| Comparative Example 1 | 4 to 5 | 1 to 2 | Within measurement error |
| Comparative Example 2 | 220 | 7 | — |

Referring to Table 3, in the examples and Comparative Example 1 using the silane-modified polyolefin, a Si content per 1 kg of paraffin oil was 5 mg or less which is within a measurement error. On the other hand, in Comparative Example 2 using trimethoxyvinylsilane, 220 mg of Si per 1 kg of paraffin oil was detected. In addition, it was confirmed that, from an additional analysis result of the paraffin oil of Comparative Example 2, many silanes, other than polyethylene, were grafted to paraffin oil in a graft process of trimethoxyvinylsilane. The silane-modified paraffin oil could not be regenerated, thus being all discarded.

Experimental Example 3

The separator manufactured according to each of the examples and the comparative examples was divided into three parts in a transverse direction (TD), and a separator specimen was extracted from the each of the parts to measure a crosslinking degree, puncture strength, and meltdown temperature. Results are summarized in Table 4 below. In Table 4 below, L denotes a measurement value of a separator specimen on one side, R denotes a measurement value of a separator specimen on the other side, and M denotes a measurement value of a separator specimen in the middle. A maximum difference is the larger value of a difference between the M value and the L value and a difference between the M value and the R value.

TABLE 4

| Classification | Example 2 | Example 4 | Comparative Example 2 | Comparative Example 3 |
|---|---|---|---|---|
| L puncture strength (gf) | 250 | 240 | 490 | 230 |
| M puncture strength (gf) | 230 | 220 | 450 | 410 |
| R puncture strength (gf) | 220 | 230 | 470 | 490 |
| Maximum difference (gf) | 30 | 20 | 40 | 260 |
| L meltdown temperature (° C.) | 211 | 224 | 193 | 212 |
| M meltdown temperature (° C.) | 208 | 215 | 179 | 157 |
| R meltdown temperature (° C.) | 207 | 219 | 187 | 149 |
| Maximum difference (° C.) | 4 | 9 | 14 | 63 |

Experimental Example 4

During the crosslinking of each of the examples and the comparative examples, the gel fraction of the separator dependent upon a crosslinking time was measured to evaluate a reaction rate dependent upon the crosslinking method and conditions. Results are summarized in Table 5 below.

TABLE 5

| Cross-linking time | Example 5 | Example 6 | Comparative Example 4 | Example 7 | Example 8 | Comparative Example 5 |
|---|---|---|---|---|---|---|
| 2 | 30 | 34 | 0 | — | — | — |
| 5 | 42 | 69 | 4 | 5 | 20 | 0 |
| 10 | 55 | 70 | 12 | 12 | 48 | 0 |
| 15 | 65 | — | 25 | 20 | 61 | 5 |
| 30 | 70 | — | 50 | 42 | — | 6 |
| 45 | — | — | 70 | — | — | — |
| 60 | — | — | — | 60 | — | 11 |

Referring to Table 5, in the case of Examples 5 and 6 in which a crosslinking reaction was continuously performed in a crosslinking bath containing propylene glycol (boiling point: 188.2° C.), a time required to achieve a crosslinking degree of about 70% was shortened to a maximum of ⅓ or less, compared to Comparative Example 4. In the case of Examples 7 and 8 in which a crosslinking reaction was continuously performed in a crosslinking bath containing ethylene glycol (boiling point: 197.3° C.) having a higher boiling point than propylene glycol, a time required to achieve a crosslinking degree of about 60% was shortened to 1/10 or less, compared to Comparative Example 5.

In a separator according to an aspect of the present disclosure and a method of manufacturing the same, a silane-modified polyolefin is mixed with a polyolefin having predetermined ranges of weight average molecular weight and molecular weight distribution in a predetermined ratio, thereby uniformly realizing excellent mechanical properties throughout a film.

The method of manufacturing a separator according to an aspect of the present disclosure uses a silane-modified polyolefin, thereby addressing a manufacturing cost increase problem due to elution and disposal of an alkoxyvinylsilane. Accordingly, productivity and economic feasibility can be maximized.

It should be understood that the effects of the present disclosure are not limited to the effects described above, but include all effects that can be deduced from the detailed description of the present disclosure or the constitution of the disclosure described in the claims.

The aforementioned description of the present disclosure is provided by way of example and those skilled in the art will understand that the present disclosure can be easily changed or modified into other specified forms without change or modification of the technical spirit or essential characteristics of the present disclosure. Therefore, it should be understood that the aforementioned examples are only provided by way of example and not provided to limit the present disclosure. For example, each of constituents described as a single form may be separately implemented and, similarly, constituents described as being separated may be implemented in a combined form.

It should be understood that the scope of the present disclosure is defined by the following claims and the disclosure is to cover all modifications, equivalents, and alternatives falling within the spirit and scope of the disclosure as defined by the claims.

What is claimed is:

1. A separator, comprising:
   a matrix comprising a polyolefin having a weight average molecular weight ($M_w$) of 250,000 to 450,000 and a molecular weight distribution ($M_w/M_n$) of 3 to 7, wherein the matrix is in a continuous phase in the separator; and
   a silane-modified polyolefin crosslinked in the matrix, wherein the silane-modified polyolefin is in a discontinuous phase in the separator, and
   wherein the separator includes 0.5 to 30% by weight of the silane-modified polyolefin
   wherein a weight ratio of the polyolefin and the silane-modified polyolefin is 20 to 40:0.5 to 30.

2. The separator according to claim 1, wherein the polyolefin is one selected from the group consisting of polyethylene, polypropylene, ethylenevinylacetate, ethylenebutylacrylate, ethyleneethylacrylate, and a combination or copolymer of two or more thereof.

3. The separator according to claim 1, wherein a content ratio of a polyolefin to a silane in the silane-modified polyolefin is 100:1 to 10 parts by weight.

4. The separator according to claim 1, wherein the silane is a vinylsilane containing an alkoxy group.

5. The separator according to claim 4, wherein the vinylsilane is one selected from the group consisting of trimethoxyvinylsilane, triethoxyvinylsilane, triacetoxyvinylsilane, and a combination of two or more thereof.

6. The separator according to claim 1, wherein the separator satisfies one or more of the following conditions (i) to (ix):
   (i) an air permeability of 50 to 300 sec/100 ml;
   (ii) a puncture strength of 15 to 65 gf/μm;
   (iii) a machine direction (MD) tensile strength of 500 to 3,000 kgf/cm$^2$;
   (iv) a transverse direction (TD) tensile strength of 500 to 2,500 kgf/cm$^2$;
   (v) a machine direction (MD) tensile elongation of 40% or more;
   (vi) a transverse direction (TD) tensile elongation of 40% or more;

(vii) a machine direction (MD) heat shrinkage at 120° C. of 20% or less;
(viii) a transverse direction (TD) heat shrinkage at 120° C. of 20% or less; and
(ix) a meltdown temperature of 170 to 250° C.

7. A method of manufacturing a separator, the method comprising:
feeding a composition comprising a polyolefin having a weight average molecular weight ($M_w$) of 250,000 to 450,000 and a molecular weight distribution ($M_w/M_n$) of 3 to 7, a silane-modified polyolefin and a pore-forming agent into an extruder and casting and orienting the same in a sheet shape;
extracting the pore-forming agent from the oriented sheet to prepare a porous film; and
crosslinking the silane-modified polyolefin comprised in the porous film,
wherein the polyolefin in the crosslinked porous film is in a continuous phase and the silane-modified polyolefin in the crosslinked porous film is in a discontinuous phase, and
wherein the composition comprises 20 to 40% by weight of the polyolefin, 0.5 to 30% by weight of the silane-modified polyolefin, and 40 to 75% by weight of the pore-forming agent.

8. The method according to claim 7, wherein the polyolefin is one selected from the group consisting of polyethylene, polypropylene, ethylenevinylacetate, ethylenebutylacrylate, ethyleneethylacrylate, and a combination or copolymer of two or more thereof.

9. The method according to claim 7, wherein the silane is a vinylsilane containing an alkoxy group.

10. The method according to claim 9, wherein the vinylsilane is one selected from the group consisting of trimethoxyvinylsilane, triethoxyvinylsilane, triacetoxyvinylsilane, and a combination of two or more thereof.

11. The method according to claim 7, wherein the pore-forming agent is one selected from the group consisting of paraffin oil, paraffin wax, mineral oil, solid paraffin, soybean oil, rape oil, palm oil, coconut oil, di-2-ethylhexylphthalate, dibutylphthalate, diisononylphthalate, diisodecylphthalate, bis(2-propylheptyl)phthalate, naphthene oil, and a combination of two or more thereof.

12. The method according to claim 7, wherein the composition further comprises a crosslinking catalyst.

13. The method according to claim 12, wherein the crosslinking catalyst is previously mixed with the pore-forming agent, and then fed through a side injector of the extruder.

14. The method according to claim 12, wherein the content of the crosslinking catalyst in the composition is 0.01 to 5% by weight.

15. The method according to claim 7, wherein, in the crosslinking, the porous film is fed into a crosslinking bath containing a solution with a boiling point of 100° C. or more and is continuously passed therethrough.

16. The method according to claim 15, wherein the solution comprises one selected from the group consisting of water, ethylene glycol, diethylene glycol, propylene glycol, and a combination of two or more thereof.

17. The method according to claim 15, wherein the crosslinking is performed at 120° C. or more.

18. The method according to claim 16, wherein the solution further comprises a crosslinking catalyst.

19. The method according to claim 18, wherein the content of the crosslinking catalyst in the solution is 0.01 to 10% by weight.

* * * * *